US 11,351,963 B2
Jun. 7, 2022

(12) United States Patent
Oh

(10) Patent No.: US 11,351,963 B2
(45) Date of Patent: Jun. 7, 2022

(54) USER AUTHENTICATION DEVICE AND METHOD USING AUTHENTICATION SCORE

(71) Applicant: LG Electronics Inc., Seoul (KR)

(72) Inventor: Soo-Hwan Oh, Seoul (KR)

(73) Assignee: LG Electronics Inc., Seoul (KR)

(*) Notice: Subject to any disclaimer, the term of this patent is extended or adjusted under 35 U.S.C. 154(b) by 461 days.

(21) Appl. No.: 16/557,106

(22) Filed: Aug. 30, 2019

(65) Prior Publication Data

US 2020/0001826 A1 Jan. 2, 2020

(30) Foreign Application Priority Data

Aug. 14, 2019 (KR) .................. 10-2019-0099548

(51) Int. Cl.
*B60R 25/24* (2013.01)
*G06F 21/32* (2013.01)
*G05D 1/00* (2006.01)
*G06F 21/45* (2013.01)
*B60R 25/25* (2013.01)
*B60R 25/32* (2013.01)

(52) U.S. Cl.
CPC .......... *B60R 25/243* (2013.01); *B60R 25/241* (2013.01); *B60R 25/25* (2013.01); *B60R 25/32* (2013.01); *G05D 1/0055* (2013.01); *G06F 21/32* (2013.01); *G06F 21/45* (2013.01); *G06F 2221/2113* (2013.01)

(58) Field of Classification Search
CPC ..... B60R 25/243; B60R 25/241; B60R 25/25; B60R 25/32; G05D 1/0055; G06F 21/32; G06F 21/45; G06F 2221/2113
See application file for complete search history.

(56) References Cited

U.S. PATENT DOCUMENTS

| | | | |
|---|---|---|---|
| 8,344,849 B2 * | 1/2013 | Larsson ................. | B60R 25/25 340/5.2 |
| 2002/0152034 A1 * | 10/2002 | Kondo .................... | G06K 9/00 702/19 |
| 2004/0217850 A1 * | 11/2004 | Perttunen ............. | B60R 25/252 340/426.17 |
| 2007/0124599 A1 * | 5/2007 | Morita ................... | B60R 25/25 713/186 |
| 2008/0252412 A1 * | 10/2008 | Larsson ............... | B60R 25/252 340/5.2 |
| 2009/0295917 A1 * | 12/2009 | Zhang ................... | G08G 1/165 348/119 |
| 2017/0076132 A1 * | 3/2017 | Sezan .................... | G06F 21/32 |

FOREIGN PATENT DOCUMENTS

KR  1020020081121  10/2002

OTHER PUBLICATIONS

Korean Office Action in Korean Appln. No. 10-2019-0099548, dated Oct. 28, 2020, 10 pages (with English translation).

\* cited by examiner

*Primary Examiner* — Thomas D Alunkal
(74) *Attorney, Agent, or Firm* — Fish & Richardson P.C.

(57) ABSTRACT

A user authentication device and method for providing a security level varying based on an authentication score of biometric information when providing an authentication-based service in an autonomous driving vehicle. The device and method may be associated with an AI device, a drone, an UAV, a robot, an AR device, a VR device, and a 5G service.

20 Claims, 9 Drawing Sheets

FIG. 8 authentication-purposed user-input type A

| Score | Result | Level | difficulty level in vehicle stop | difficulty level in speed 40km/h | difficulty level in speed 80km/h |
|---|---|---|---|---|---|
| 0~70 | Reject | 0 | NA | NA | NA |
| 71~80 | Accept | 2 | Low | Low | Middle |
| 81~90 | Accept | 3 | Low | Middle | High |
| 91~100 | Accept | 4 | Middle | High | Very High |

| Score | Result | Level | difficulty level in manual driving | difficulty level in semi-autonomous driving | difficulty level in autonomous driving |
|---|---|---|---|---|---|
| 0~70 | Reject | 0 | NA | NA | NA |
| 71~80 | Accept | 2 | Middle | Low | Low |
| 81~90 | Accept | 3 | High | Middle | Low |
| 91~100 | Accept | 4 | Very High | High | Middle |

| Score | Result | Level | difficulty level in daytime | difficulty level nighttime |
|---|---|---|---|---|
| 0~70 | Reject | 0 | NA | NA |
| 71~80 | Accept | 2 | Low | Middle |
| 81~90 | Accept | 3 | Low | High |
| 91~100 | Accept | 4 | Middle | Very High |

FIG. 9 authentication-purposed user-input type B

| Score | Result | Level | difficulty level in vehicle stop | difficulty level in speed 40km/h | difficulty level in speed 80km/h |
|---|---|---|---|---|---|
| 0~70 | Reject | 0 | NA | NA | NA |
| 71~80 | Accept | 1 | Low | Low | Middle |
| 81~90 | Accept | 2 | Low | Middle | High |

| Score | Result | Level | difficulty level in manual driving | difficulty level in semi-autonomous driving | difficulty level in autonomous driving |
|---|---|---|---|---|---|
| 0~70 | Reject | 0 | NA | NA | NA |
| 71~80 | Accept | 1 | Low | Low | Low |
| 81~90 | Accept | 2 | Middle | Middle | Low |

| Score | Result | Level | difficulty level in daytime | difficulty level nighttime |
|---|---|---|---|---|
| 0~70 | Reject | 0 | NA | NA |
| 71~80 | Accept | 1 | Low | Low |
| 81~90 | Accept | 2 | Low | Middle |

USER AUTHENTICATION DEVICE AND METHOD USING AUTHENTICATION SCORE

CROSS-REFERENCE TO RELATED APPLICATIONS

This application claims the priority of Korean Patent Application No. 10-2019-0099548 filed on Aug. 14, 2019, in the Korean Intellectual Property Office, the disclosure of which is hereby incorporated by reference in its entirety.

BACKGROUND

1. Technical Field

The present disclosure relates to a user authentication device and method for providing security level variations based on an authentication score of biometric information when providing an authentication-based service in an autonomous driving vehicle.

2. Description of the Related Art

Currently, features used in a biometric recognition system include faces, voices, hand shapes, irises, veins, and fingerprints, and biometric recognition systems corresponding to each feature are being actively researched.

In particular, biometric recognition technology is employed in portable electronic devices such as smartphones. Recently, with spread of autonomous driving technology and popularization of shared vehicles, biometric recognition technology is becoming more popular to provide personal identification and personal customized services for vehicles.

Among various biometric recognitions, fingerprint recognition is the most widely adopted. The fingerprint identification has advantages of being more secure and high availability than other biometric recognition technologies.

However, due to cost and space constraints, the fingerprint sensors are very small in size and usually receive only a very small portion of the fingerprint. As such, when only a part of the fingerprint is received, a corresponding security level is low due to insufficient feature information.

The security level is usually determined based on a FAR (false acceptance rate). In a fingerprint recognition with a full fingerprint, the false acceptance rate is about 1/100,000, 000. However, in a fingerprint recognition with only a portion of a fingerprint, for example in portable electronic devices, it is hard to reduce the false acceptance rate to about to 1/100,000 or smaller.

Therefore, it is very risky to use the fingerprint recognition function employed in the portable electronic device for payment or financial service that requires a very high security level.

In order to improve the security of biometric recognition such as the fingerprint recognition, additional authentication techniques, such as password authentication and gesture authentication, have been used. In one example, recognizing an additional motion (gesture) at the same time as a face recognition is used.

Accordingly, an additional authentication-purposed user-input type or a high accuracy authentication-purposed user-input type must be used to satisfy a high security level.

However, when using the additional authentication-purposed user-input type, it is needed to perform authentication of the additional authentication-purposed user-input type together with biometric authentication, for example, double authentications which may be inconvenient for a user.

Further, the use of the high accuracy authentication-purposed user-input type may increase the accuracy of authentication but takes a long authentication time or increases probability of authentication failure. Further, an authentication device uses a highly accurate authentication-purposed user-input type when authenticating the user for every target service. That is, the authentication device uses the same authentication-purposed user-input type for all target services. Thus, the authentication device uses a high accuracy authentication-purposed user-input type for a target service that does not require a high security. Therefore, the user may feel inconvenience that the authentication time is long even for a target service requiring fast and simple authentication.

SUMMARY

A purpose of the present disclosure is to provide a user authentication device and method for providing security level variations based on an authentication score of biometric information when providing an authentication-based service in an autonomous driving vehicle.

Further, another purpose of the present disclosure is to provide a user authentication device and method to vary a security level satisfying-ability corresponding to an authentication-purposed user-input type. In this connection, a security level may be calculated based on an authentication score database and error rate statistics.

Further, another purpose of the present disclosure is to provide a user authentication device and method for presenting an optimal authentication-purposed user-input type to satisfy a target security level to the user based on an experience-based security level satisfying-ability and situation-based authentication performance ability corresponding to an authentication-purposed user-input type.

Further, another purpose of the present disclosure is to provide a user authentication device and method in which a single authentication-purposed user-input type is associated with multiple security levels.

Further, another purpose of the present disclosure is to provide a user authentication device and method in which a high security level is allocated to an authentication-purposed user-input type for a target service requiring a high security, while a low security level is allocated to an authentication-purposed user-input type for a target service requiring a low security.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In accordance with the present disclosure, a user authentication device and method using an authentication score according to the present disclosure may preform optimal authentication-purposed user-input type selection and driving state adjustment based on a security level satisfying-ability and actual security level satisfying-ability based on a driving state corresponding to an authentication-purposed user-input type in order to secure different security levels based on the vehicle status, autonomous driving status, and driver status when providing authentication-based services in a vehicle environment.

Further, in accordance with the present disclosure, a user authentication device and method using an authentication score according to the present disclosure may determine a security level based on an authentication score and an authentication error rate corresponding to an authentication-purposed user-input type.

Further, in accordance with the present disclosure, a user authentication device and method using an authentication score according to the present disclosure may select and recommend an authentication-purposed user-input type having the highest current and previous authentication performances to the user.

Further, in accordance with the present disclosure, a user authentication device and method using an authentication score according to the present disclosure may be configured such that a single authentication-purposed user-input type is associated with multiple security levels, and such that a high security level is allocated to an authentication-purposed user-input type for a target service requiring a high security, while a low security level is allocated to an authentication-purposed user-input type for a target service requiring a low security.

In a first aspect, there is provided a user authentication device comprising: a security level extraction unit configured to extract a first security level corresponding to an input target service; an authentication-purposed user-input type detection unit configured to detect an authentication-purposed user-input type based on an environment status of a vehicle and a user, wherein the authentication-purposed user-input type is associated with a second security level; an authentication score generation unit configured to: analyze a matching score distribution corresponding to the detected authentication-purposed user-input type; extract a third security level based on False Acceptance Rate (FAR) and False Reject Rate (FRR) associated with the analysis result; match the extracted third security level with the second security level; and generate an authentication score corresponding to the detected authentication-purposed user-input type based on the match result; a security level verification unit configured to: define the authentication score of the authentication-purposed user-input type as a target security level; and verify whether an input value of the authentication-purposed user-input type satisfies the target security level; and an authentication processing unit configured to, based on the input value of the authentication-purposed user-input type satisfying the target security level, perform user authentication using the authentication-purposed user-input type.

In one implementation of the first aspect, the authentication-purposed user-input type detection unit comprises: a state extraction unit configured to extract an environment state of a vehicle and a user based on environment information around the user; a security level calculating unit configured to calculate the second security level associated with the authentication-purposed user-input type; and an authentication-purposed user-input type selection unit configured to select an authentication-purposed user-input type having a high satisfaction level or a low difficulty level to match to the first security level.

In one implementation of the first aspect, the authentication score generation unit comprises: a data distribution analyzing unit configured to analyze the matching score distribution corresponding to the detected authentication-purposed user-input type and define a default threshold to validate the user authentication based on the analysis result; a matching score calculating unit configured to calculate at least two or more matching scores having different security levels based on the default threshold corresponding to each authentication-purposed user-input type; a matching unit configured to define the third security level by using an error rate table having error rates of the at least two matching scores, wherein the third security level matches with the second security level; and an authentication score determination unit configured to determine the authentication score of the authentication-purposed user-input.

In one implementation of the first aspect, the matching score calculating unit calculates matching scores by using an error rate in FAR and FRR graphs.

In one implementation of the first aspect, further comprising: an environment processing unit configured to: reselect an authentication-purposed user-input type suitable for a current situation based on a determination that the input value of the authentication-purposed user-input type does not satisfy the target security level or based on the target security level changes due to an environment change; and present the reselected authentication-purposed user-input type to the user; and an environment recognition unit configured to extract environment information around the user to obtain environment data.

In one implementation of the first aspect, the first security level is configured based on risk or safety attributes of the target service.

In one implementation of the first aspect, the authentication-purposed user-input type detection unit is further configured to detect an authentication-purposed user-input type having a high satisfaction level or a low difficulty level to match to the first security level.

In one implementation of the first aspect, the authentication-purposed user-input type comprises at least one of a user identifier (ID), password, token, user biometric information, or user motion.

In one implementation of the first aspect, based on a determination that the input value of the authentication-purposed user-input type does not satisfy the target security level or based on the target security level changing due to an environment change, the environment processing unit is further configured to: reextract environment information around the user by an environment processing unit to acquire new environment data; update current environment data into the new environment data; and reselect an authentication-purposed user-input type corresponding to a current situation.

In one implementation of the first aspect, the environment processing unit is configured to reselect the authentication-purposed user-input type by: changing a driving environment or controlling a driving state; recording a previous state before controlling the driving state or changing the driving environment; and restoring the previous state after performing authentication using the reselected authentication-purposed user-input type.

In one implementation of the first aspect, the default threshold for authentication-purposed user-input type is configured based on each of matching score distributions for a target person and a non-target person.

In a second aspect, there is provided an user authentication method comprising: extracting, by a security level extraction unit, a first security level corresponding to an input target service; detecting, by an authentication-purposed user-input type detection unit, an authentication-purposed user-input type based on an environment status of a vehicle and a user based on environment information around the user, wherein the authentication-purposed user-input type is associated with a second security level corresponding to the each authentication-purposed user-input type; analyzing, by an authentication score generation unit, a matching score distribution corresponding to the detected authentication-purposed user-input type, extracting, by the authentication score generation unit, a third security level based on False Acceptance Rate (FAR) and False Reject Rate (FRR) associated with the analysis result, matching, by the authentication score generation unit, the third security level with the second security level, generating, by the authentication score generation unit, an authentication score corresponding to the detected authentication-purposed user-input type based on the match result; defining, by a security level verification unit, the authentication score of the authentication-purposed user-input type as a target security level; verifying, by the security level verification unit, whether an input value of the authentication-purposed user-input type satisfies the target security level; and performing based on the input value of the authentication-purposed user-input type satisfying the target security level, by an authentication processing unit, user authentication using the authentication-purposed user-input type.

In one implementation of the second aspect, the detecting an authentication-purposed user-input type comprises: extracting, by a state extraction unit, an environment state of a vehicle and a user based on environment information around the user; calculating, by a security level calculating unit, the second security level associated with the authentication-purposed user-input type; and selecting, by an authentication-purposed user-input type selection unit, an authentication-purposed user-input type having a high satisfaction level or a low difficulty level among the calculated second security levels, to match to the first security level.

In one implementation of the second aspect, the authentication score generation unit performs operations further comprises: analyzing, by a data distribution analyzing unit, the matching score distribution corresponding to the detected authentication-purposed user-input type; defining, by the data distribution analyzing unit, a default threshold for verifying authentication based on the analysis result; calculating, by a matching score calculating unit, at least two or more matching scores having different security levels based on the default threshold corresponding to authentication-purposed user-input type; defining, by a matching unit, the third security level using an error rate table having error rates of the at least two matching scores, wherein the third security level matches with the second security level; and determining, by an authentication score determination unit, the authentication score of the authentication-purposed user-input type.

In one implementation of the second aspect, the default threshold for each authentication-purposed user-input type is configured based on each of matching score distributions for a target person and a non-target person.

In one implementation of the second aspect, calculating, by the matching score calculating unit, at least two or more matching scores comprises calculating matching scores using an error rate in FAR and FRR graphs.

In one implementation of the second aspect, detecting the third security level comprises defining a FAR-based security level; and selecting a threshold corresponding to the authentication-purposed user-input type to satisfy the FAR-based security level.

In one implementation of the second aspect, the method further comprising: based on a determination that the input value of the authentication-purposed user-input type does not satisfy the target security level or based on the target security level changing due to an environment change, re-extracting, by an environment processing unit, environment information around the user to acquire new environment data; updating, by the environment processing unit, current environment data into the new environment data; and re-selecting, by the environment processing unit, an authentication-purposed user-input type corresponding to a current situation.

In one implementation of the second aspect, reselecting the authentication-purposed user-input type comprises changing a driving environment or controlling a driving state; recording a previous state before controlling the driving state or changing the driving environment; and restoring the previous state after performing authentication using the reselected authentication-purposed user-input type.

In one implementation of the second aspect, the authentication-purposed user-input type comprises at least one of a user identifier (ID), password, token, user biometric information, or user motion.

Advantages of the present disclosure are as follows but are not limited thereto.

In accordance with the user authentication device and method using an authentication score according to the present disclosure, the user authentication device and method may provide a security level varying based on an authentication score of biometric information when providing an authentication-based service in an autonomous driving vehicle.

Further, in accordance with the user authentication device and method using an authentication score according to the present disclosure, the user authentication device and method may vary a security level satisfying-ability corresponding to an authentication-purposed user-input type.

Further, in accordance with the user authentication device and method using an authentication score according to the present disclosure, the user authentication device and method may present an optimal authentication-purposed user-input type to satisfy a target security level to the user based on an experience-based security level satisfying-ability and situation-based authentication performance ability corresponding to an authentication-purposed user-input type.

Further, in accordance with the user authentication device and method using an authentication score according to the present disclosure, a single authentication-purposed user-input type is associated with multiple security levels. Thus, the user convenience may be improved.

Further, in accordance with the user authentication device and method using an authentication score according to the present disclosure, a high security level is allocated to an authentication-purposed user-input type for a target service requiring a high security, while a low security level is allocated to an authentication-purposed user-input type for a target service requiring a low security. Therefore, quick and easy authentication may be used for target services that require quick and simple authentication. High accuracy authentication may be used for target services that require a high security.

In addition to the advantages as described above, specific advantages of the present disclosure are described together with specific details for carrying out the described technology.

BRIEF DESCRIPTION OF DRAWINGS

FIG. 8 and FIG. 9 show example methods for evaluating an expected satisfaction level or difficulty level for authenticating an authentication-purposed user-input type in FIG. 3.

DETAILED DESCRIPTIONS

Figure 1:
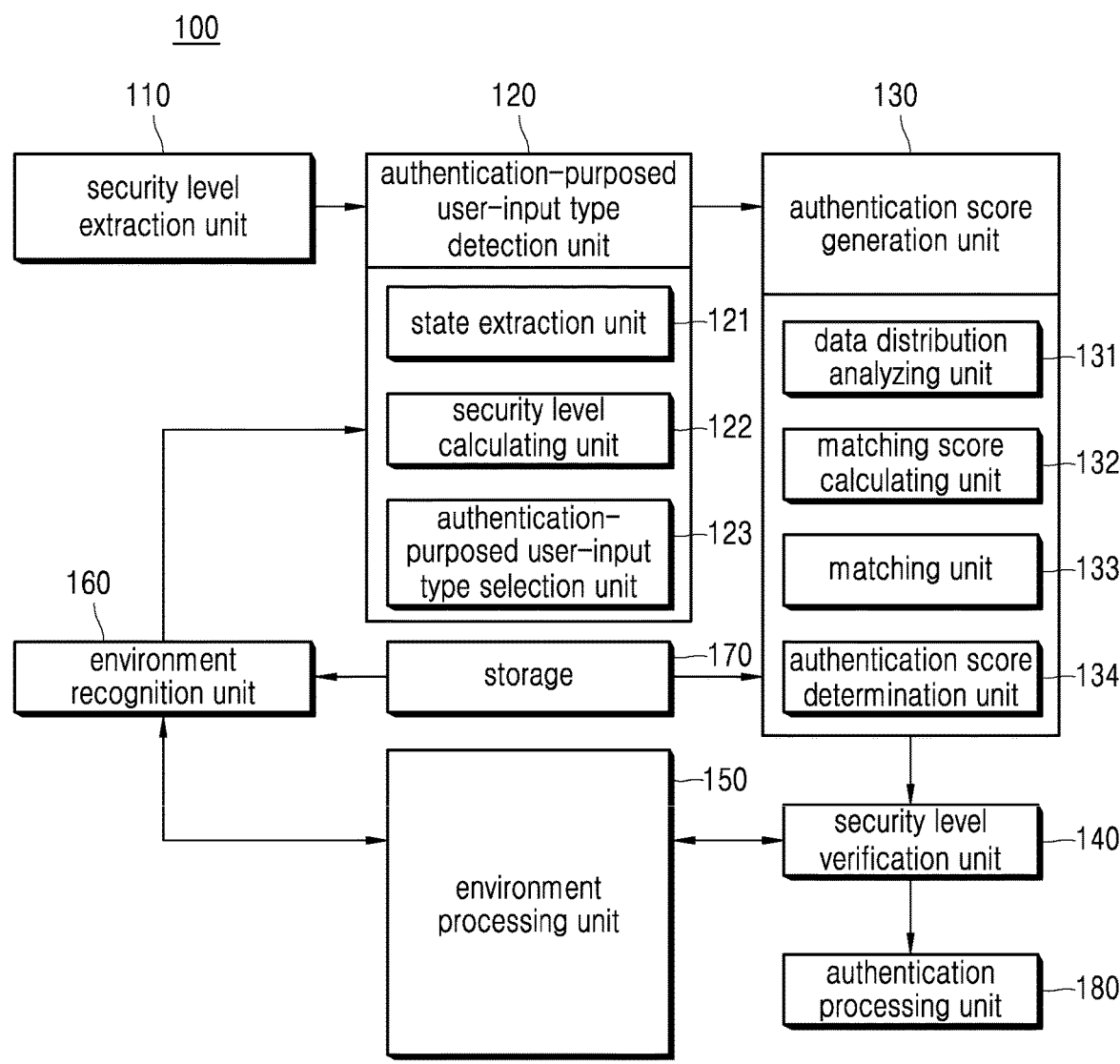
FIG. 1 is a block diagram showing an example configuration of a user authentication device using an authentication score.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a user authentication device and method using an authentication score according to some embodiments of the present disclosure will be described.

FIG. 1 is a block diagram showing a configuration of an example user authentication device using an authentication. A user authentication device 100 using an authentication score shown in FIG. 1 is merely based on an embodiment. Components thereof are not limited to the embodiment shown in FIG. 1. Some components thereof may be added, changed, or deleted as necessary.

As shown in FIG. 1, the user authentication device 100 according to the present disclosure includes a security level extraction unit 110, an authentication-purposed user-input type detection unit 120, an authentication score generation unit 130, a security level verification unit 140, an environment processing unit 150, an environment recognition unit 160, a storage 170, and an authentication processing unit 180.

The security level extraction unit 110 extracts a first security level required for an input target service. The first security level represents a difficulty level at which a user is authenticated to provide a target service. That is, the first security level depends on the target service. The first security level may be preset in a storage 170 based on the target service. However, the present disclosure is not limited thereto. The first security level may be defined by an external agency. For example, an external organization may specify the first security level based on various criteria, such as security requirements of an application itself, security policies of a company hosting a requested service, and so on.

In one example, the first security level may be based on a risk associated with the required target service. For example, if the requested service includes sending and receiving sensitive information, e.g., in a banking service that sends and receives bank account information, the required first security level may be high. Alternatively, when the requested service is to start up a vehicle in an autonomous driving vehicle, or when the service is related to safety of the vehicle driving in performing autonomous driving, the required first security level may be high. In a further example, the required first security level may be low when the requested target service is associated with a low risk, that is, includes a service that does not have access to personal information. Alternatively, when the target service is not related to the safety of the vehicle, for example, includes changing a sound volume and a radio channel of a radio device and TV while driving the autonomous driving vehicle, the required first security level may be low.

The user authentication device 100 may allocate a security level to a target service with considering sensitivity and risk associated with the target service, thereby avoiding excessive inconvenience to users.

The authentication-purposed user-input type detection unit 120 extracts an environment status of the vehicle and the driver based on environment information around the user. Then, the authentication-purposed user-input type detection unit 120 detects a second security level satisfiable by an authentication-purposed user-input type stored in advance in the storage 170. That is, the second security level is allocated to an authentication-purposed user-input type.

Subsequently, the authentication-purposed user-input type detection unit 120 selects an authentication-purposed user-input type having a low level of difficulty or having a high expected satisfaction level to meet the first security level extracted from the security level extraction unit 110. In one example, the authentication-purposed user-input type with the high expected satisfaction level means an authentication-purposed user-input type with a low authentication error rate when user authentication is performed using an input value of a corresponding authentication-purposed user-input type. Further, the authentication-purposed user input with the low difficulty level means an authentication-purposed user-input type with a high success rate when user authentication is performed based on a default threshold of a corresponding authentication-purposed user input type.

Then, the authentication-purposed user-input type refers to a factor type used for user authentication. The authentication-purposed user-input type may include a user biometric feature or user motion. For example, the authentication-purposed user-input type may include user identifier (ID), password, token, user's biometric information, motion information, and so on. Biometric information may include fingerprints, veins, retinas, irises, voices, and images. Motion information may include gestures, text, position of touch points, shapes, and areas.

To this end, the authentication-purposed user-input type detection unit 120 may include a state extraction unit 121, a security level calculating unit 122, and an authentication-purposed user-input type selection unit 123.

The state extraction unit 121 extracts the environmental status of the vehicle and driver based on environmental information around the user.

The security level calculating unit 122 calculates a second security level which may be satisfied by each authentication-purposed user-input type and may be stored in the storage 170 in advance.

The authentication-purposed user-input type selection unit 123 selects an authentication-purposed user-input type having a high satisfaction level or a low difficulty level among the calculated second security levels from the security level calculating unit 122. That is, the authentication-purposed user-input type selection unit 123 selects an authentication-purposed user-input type having a high satisfaction level to meet the first security level extracted from the security level extraction unit 110. In one example, the authentication-purposed user-input type with the high satisfaction level means an authentication-purposed user-input type with a low authentication error rate when user authentication is performed using an input value of a corresponding authentication-purposed user-input type. Further, the authentication-purposed user input with the low difficulty level means an authentication-purposed user-input type with a high success rate when user authentication is performed based on a default threshold of a corresponding authentication-purposed user input type. In this connection, at least one or more authentication-purposed user-input types may be selected for each target service.

The authentication score generation unit 130 analyzes a matching score distribution for the authentication-purposed user-input type as selected by the authentication-purposed user-input type detection unit 120, and extracts a third security level based on False Acceptance Rate (FAR) and False Reject Rate (FRR). Then, the authentication score generation unit 130 generates an authentication score corresponding to the authentication-purposed user-input type based on a matching score between the extracted third security level and the second security level. In this connection, the authentication score refers to a frequency threshold at which the authentication-purposed user-input type meets an authentication performance correspond to a required security level.

To this end, the authentication score generation unit 130 includes a data distribution analyzing unit 131, a matching score calculating unit 132, a matching unit 133, and an authentication score determination unit 134.

The data distribution analyzing unit 131 analyzes a matching score distribution for the authentication-purposed user-input type detected by the authentication-purposed user-input type detection unit 120 and defines a default frequency threshold used for validating the user authentication based on the analysis result.

The matching score calculating unit 132 calculates at least two or more matching scores having different security levels based on the default threshold corresponding to each authentication-purposed user-input type. In this connection, the matching score calculating unit 132 calculates the matching score using an error rate in the FAR and FRR graphs.

The matching unit 133 detects the third security level that matches the second security level using an error rate table having an error rate of at least two matching scores calculated by the matching score calculating unit 132.

The authentication score determination unit 134 determines an authentication score corresponding to the authentication-purposed user-input type as the third security level matched by the matching unit 133.

The security level verification unit 140 defines the authentication score of the authentication-purposed user-input type determined by the authentication score generation unit 130 as a target security level and verifies whether an actual input value of the authentication-purposed user-input type satisfies the target security level.

In this connection, the input value of the authentication-purposed user-input type refers to input information corresponding to the authentication-purposed user-input type which the user inputs for user authentication. The input value may include a value of user identifier ID, password, token, biometric information of the user, or motion information, etc.

In a case where the security level verification unit 140 determines that the input value of the authentication-purposed user-input type does not satisfy the target security level or when the target security level changes due to the environment change, the environment processing unit 150 reselects an authentication-purposed user-input type suitable for the current situation and presents the same to the user.

In one example, when the authentication device suggests an authentication-purposed user-input type A to the user in a low speed driving state, the user may increase the speed. In this case, the authentication-purposed user-input type A will fail to meet the target security level at a high speed. In this response, the environment processing unit 150 may determine that a combination of authentication-purposed user-input types B and C may satisfy the target security level, and may suggest the combination to the user. The changes in the environment that might disallow the authentication-purposed user-input type A to meet the target level may include not only the change in the speed but also changes in the environment, such as tunnels, window openings, and interiors.

The environment recognition unit 160 extracts environment information around the user to obtain environment data. In this connection, the environment information may include information indicating the vehicle and user situation, such as brightness, noise, vehicle position, current time, current weather, vehicle driving state, and autonomous driving state. The environment recognition unit 160 may include a sensor that detects temperature, eye, rain, humidity, a sensor that detects ambient brightness, and a receiver that receives vehicle and user situation information received from an external device. However, the environment recognition unit 160 is not limited thereto and may include various sensors or receivers that may recognize and detect vehicle and user situations such as brightness, noise, vehicle position, current time, current weather, vehicle driving state, and autonomous driving state.

When the input value of the authentication-purposed user-input type satisfies the target security level, the authentication processing unit 180 may perform user authentication by using the authentication-purposed user-input type to which the verified target security level is applied.

Thus, the user may receive the target service based on the user authentication result.

In one example, the user authentication device 100 may perform user authentication to provide a target service for an autonomous driving vehicle to a user.

In this connection, the autonomous driving vehicle may be operated by a transportation company server, such as a car sharing company or may be an autonomous driving vehicle that drives to its destination without the operator's manipulation. Further, the vehicle may include any mode of transportation, such as a car, a train, and a motorcycle. Here, an example of a car will be described below for the convenience of description. Further, the shared vehicle may be an internal combustion engine vehicle having an engine as a power source, a hybrid vehicle having an engine and an electric motor as the power source, or an electric vehicle having an electric motor as the power source.

Then, the autonomous driving vehicle may include a user interface device, an object detecting device, a communication device, a driving manipulation device, a main ECU, a driving control device, an autonomous driving device, a sensor, and a position data generating device. Each of the object detecting device, the communication device, the driving manipulation device, the main ECU, the driving control device, the autonomous driving device, the sensor and the position data generating device may be implemented as an electronic device for generating an electrical signal and for exchanging the electrical signal with another device.

The user interface device is configured for communicating between the autonomous driving vehicle and the user. The user interface device may receive user input, and may provide the user with information generated by the autonomous driving vehicle. The autonomous driving vehicle may implement a UI (User Interface) or a UX (User Experience) via the user interface device. The user interface device may include an input device, an output device, and a user monitoring device.

The object detecting device may generate information about an object external to the autonomous driving vehicle. The information on the object may include at least one of information on presence or absence of the object, position information of the object, distance information between the autonomous driving vehicle and the object, or relative speed information between the autonomous driving vehicle and the object. The object detecting device may detect an object external to the autonomous driving vehicle. The object detecting device may include at least one sensor that may detect an object external to the autonomous driving vehicle. The object detecting device may include at least one of a camera, a radar, a lidar, an ultrasonic sensor, or an infrared sensor. The object detecting device may provide at least one electronic device included in the vehicle with data about the object generated based on the sensing signal generated by the sensor.

The camera may generate information about the object external to the autonomous driving vehicle using the image. The camera may include at least one lens, at least one image sensor, and at least one processor. The processor may be electrically connected to the image sensor and then process a received signal therefrom and generate data about an object based on the processed signal.

The camera may include at least one of a mono camera, a stereo camera, or an AVM (Around View Monitoring) camera. The camera may acquire position information of the object, distance information to the object, or relative speed information relative to the object using various image processing algorithms. For example, the camera may obtain distance information to and relative speed information with respect to the object based on a change of an object size over time in the acquired image. For example, the camera may obtain the distance information to and relative speed information with respect to the object via a pinhole model, road-face profiling, or the like. For example, the camera may obtain the distance information to and relative speed information with respect to the object based on disparity information in a stereo image acquired by a stereo camera.

The camera may be mounted at a position that allows a field of view (FOV) in the vehicle to image a scene external to the vehicle. The camera may be placed at a front windshield and in an interior of the vehicle to obtain an image in front of the vehicle. The camera may be disposed adjacent to a front bumper or radiator grille. The camera may be placed at a rear glass and in the interior of the vehicle to obtain an image behind the vehicle. The camera may be disposed adjacent to a rear bumper, a trunk or a tail gate. The camera may be disposed at least one of side windows and in an interior of the vehicle to obtain a right or left side image to the vehicle. Alternatively, the camera may be positioned adjacent to a side mirror, a fender or a door.

The radar may generate information about an object external to the autonomous driving vehicle using a radio wave. The radar may include an electromagnetic wave transmitter, an electromagnetic wave receiver, and at least one processor electrically connected to the electromagnetic wave transmitter and the electromagnetic wave receiver to process the received signal therefrom to generate data about an object based on the processed signal. The radar may be implemented in a pulse radar manner or a continuous wave radar manner based on a principle of the radio wave emission. The radar in the continuous wave radar manner may be classified into a FMCW (Frequency Modulated Continuous Wave) type and a FSK (Frequency Shift Keying) type based on a signal waveform. The radar detects the object using the electromagnetic wave in the TOF (Time of Flight) or phase shift manner and thus determines a position of the detected object, a distance to the detected object, and the relative speed thereto. The radar may be positioned at an appropriate position on an outer face of the vehicle to detect an object positioned in front, rear of or right or left to the vehicle.

The lidar may generate information about an object external to the autonomous driving vehicle using a laser light. The lidar may include an optical transmitter, an optical receiver and at least one processor electrically connected to the optical transmitter and the optical receiver to process a received signal therefrom for generating data about the object based on the processed signal. The lidar may be implemented in a TOF (time of flight) manner or a phase-shift manner. The lidar may be implemented in a movable or fixed manner. When the lidar is implemented in the movable manner, the lidar is rotated by a motor, and detects objects around the autonomous driving vehicle. When the lidar is implemented in a fixed manner, the lidar may detect an object positioned within a predefined range with respect to the vehicle using optical steering. The autonomous driving vehicle may include a plurality of fixed lidars. The lidar detects an object in a TOF (Time of Flight) manner or a phase-shift manner via laser light, and thus determines a position of the detected object, a distance to the detected object, and the relative speed thereto. The lidar may be positioned at an appropriate position on an outer face of the vehicle to detect an object positioned in front, rear of or right or left to the vehicle.

The communication device may exchange signals with a device external to the autonomous driving vehicle. The communication device may exchange signals with at least one of an infrastructure (for example, a server, a broadcasting station), another vehicle, or a terminal. The communication device may include at least one of a transmit antenna, a receive antenna, an RF (radio frequency) circuit capable of implementing various communication protocols, or an RF element to perform communication.

The driving manipulation device is configured to receive a user input for driving. In a manual mode, the autonomous driving vehicle may be driven based on a signal provided by the driving manipulation device. The driving manipulation device may include a steering input device such as a steering wheel, an acceleration input device such as an accelerator pedal, and a braking input device such as a brake pedal.

The main ECU may control overall operations of at least one electronic device provided in the autonomous driving vehicle.

The drive control device is configured to electrically control various vehicle drive devices in the autonomous driving vehicle. The drive control device may include a power train drive control device, a chassis drive control device, a door/window drive control device, a safety device drive control device, a lamp drive control device and an air conditioning drive control device. The power train drive control device may include a power source drive control device and a transmission drive control device. The chassis drive control device may include a steering drive control device, a brake drive control device and a suspension drive control device. In one example, the safety device drive control device may include a seat belt drive control device for seat belt control.

The drive control device includes at least one electronic control device, for example, a control ECU (Electronic Control Unit).

The drive control device may control the vehicle drive device based on the signal received from the autonomous driving vehicle. For example, the drive control device may control the power train, steering device and brake device based on the signal received from the autonomous driving vehicle.

The autonomous driving device may generate a route for autonomous driving based on the obtained data. The autonomous driving device may generate a driving plan for driving along the generated route. The autonomous driving device may generate a signal for controlling movement of the vehicle according to the driving plan. The autonomous driving device may provide the generated signal to the drive control device.

The autonomous driving device may implement at least one ADAS (Advanced Driver Assistance System) function. The ADAS may implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), PD (pedestrian) collision warning, TSR (Traffic Sign Recognition), TSA (Traffic Sign Assist), NV (Night Vision), DSM (Driver Status Monitoring), or TJA (Traffic Jam Assist).

The autonomous driving device may perform a switching operation from the autonomous driving mode to a manual driving mode or a switching operation from the manual driving mode to the autonomous driving mode. For example, the autonomous driving device may switch a mode of the autonomous driving vehicle from the autonomous driving mode to the manual driving mode or from the manual driving mode to the autonomous driving mode based on the signal received from the user interface device.

The sensor may sense a state of the vehicle. The sensor may include at least one of a IMU (inertial measurement unit) sensor, a collision sensor, a wheel sensor, a speed sensor, a tilt sensor, a weight sensor, a heading sensor, a position module, a vehicle forward/rearward sensor, a battery sensor, a fuel sensor, a tire sensor, a steering sensor, a temperature sensor, a humidity sensor, an ultrasonic sensor, a luminance sensor, or a pedal position sensor. In one example, the IMU (inertial measurement unit) sensor may include one or more of an acceleration sensor, a gyro sensor, and a magnetic sensor.

The sensor may generate state data of the vehicle based on a signal generated from the at least one sensor. The vehicle state data may include information generated based on the data sensed by various sensors provided in the vehicle. The sensors may generate vehicle attitude data, vehicle motion data, vehicle yaw data, vehicle roll data, vehicle pitch data, vehicle collision data, vehicle direction data, vehicle angle data, vehicle speed data, vehicle acceleration data, vehicle tilt data, vehicle forward/rearward data, vehicle weight data, battery data, fuel data, tire inflation data, vehicle internal temperature data, humidity data inside a vehicle, steering wheel rotation angle data, vehicle external illuminance data, pressure data applied to an accelerator pedal, pressure data applied to a brake pedal, etc.

The position data generating device may generate position data of the vehicle. The position data generating device may include at least one of a GPS (Global Positioning System) and a DGPS (Differential Global Positioning System). The position data generating device may generate position data of the vehicle based on a signal generated from at least one of the GPS and the DGPS. According to an embodiment, the position data generating device may correct the position data based on at least one of data from the IMU (Inertial Measurement Unit) sensor and the camera of the object detecting device. The device for generating the position data may be referred to as a GNSS (Global Navigation Satellite System).

The autonomous driving vehicle may include an internal communication system. A plurality of electronic devices included in the autonomous driving vehicle may exchange signals through an internal communication system. The signal may include data. The internal communication system may use at least one communication protocol, for example CAN, LIN, FlexRay, MOST, or Ethernet.

An operation of the user authentication device using the authentication score according to the present disclosure configured as described above will be described in detail with reference to the accompanying drawings. The same reference numerals as in FIG. 1 refer to the same members performing the same functions in following drawings.

Figure 2:
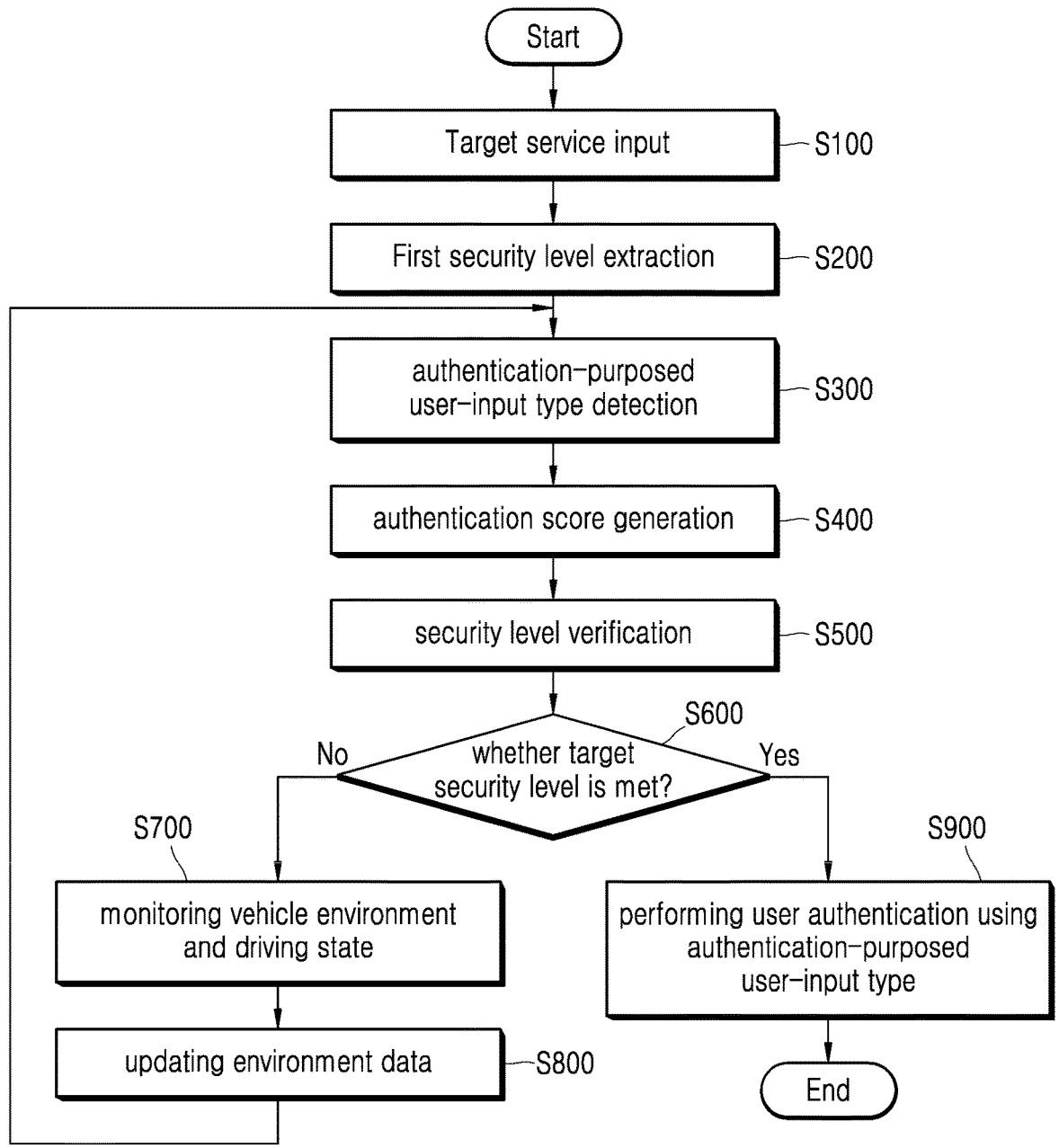
FIG. 2 is a flow chart for describing an example user authentication method using an authentication score.

FIG. 2 is a flow chart for describing a user authentication method using an authentication score.

Referring to FIG. 2, when a target service is input from the user (S100), the security level extraction unit 110 of the user authentication device 100 extracts a first security level required for the input target service (S200).

The first security level represents a difficulty level at which a user is authenticated to provide a target service. That is, the first security level depends on the target service. The first security level may be preset in a storage 170 based on the target service. However, the present disclosure is not limited thereto. The first security level may be defined by an external agency. For example, an external organization may specify the first security level based on various criteria, such as security requirements of an application itself, security policies of a company hosting a requested service, and so on.

In one example, the first security level may be based on a risk associated with the required target service. For example, if the requested service includes sending and receiving sensitive information, for example, in a banking service that sends and receives bank account information, the required first security level may be high. Alternatively, when the requested service is to start up a vehicle in an autonomous driving vehicle, or when the service is related to safety of the vehicle driving in performing autonomous driving, the required first security level may be high. In a further example, the required first security level may be low when the requested target service is associated with a low risk, that is, includes a service that does not have access to personal information. Alternatively, when the target service is not related to the safety of the vehicle, for example, includes changing a sound volume and a radio channel of a radio device and TV while driving the autonomous driving vehicle, the required first security level may be low.

Subsequently, the authentication-purposed user-input type detection unit 120 extracts an environment status of the vehicle and the driver based on environment information around the user.

Then, the authentication-purposed user-input type detection unit 120 detects a second security level satisfiable by an authentication-purposed user-input type and stored in advance in the storage 170. That is, the second security level is allocated to an authentication-purposed user-input type.

Subsequently, the authentication-purposed user-input type detection unit 120 selects an authentication-purposed user-input type having a low level of difficulty or having a high expected satisfaction level to meet the first security level extracted from the security level extraction unit 110 (S300). In one example, the authentication-purposed user-input type with the high expected satisfaction level means an authentication-purposed user-input type with a low authentication error rate when user authentication is performed using an input value of a corresponding authentication-purposed user-input type. Further, the authentication-purposed user input with the low difficulty level means an authentication-purposed user-input type with a high success rate when user authentication is performed based on a default threshold of a corresponding authentication-purposed user input type.

The process (S300) of selecting the authentication-purposed user-input type as described will be described below with reference to FIG. 3.

Then, the authentication score generation unit 130 analyzes a matching score distribution for the authentication-purposed user-input type as selected by the authentication-purposed user-input type detection unit 120, and extracts a third security level based on False Acceptance Rate (FAR) and False Reject Rate (FRR). Then, the authentication score generation unit 130 generates an authentication score corresponding to the authentication-purposed user-input type based on a matching score between the extracted third security level and the second security level (S400). In this connection, the authentication score refers to a frequency threshold at which the authentication-purposed user-input type meets an authentication performance correspond to a required security level.

The process (S400) of generating the authentication score as described in the S400 is described below with reference to FIG. 4.

Then, the security level verification unit 140 defines the authentication score of the authentication-purposed user-input type determined by the authentication score generation unit 130 as a target security level (S500) and verifies whether an actual input value of the authentication-purposed user-input type satisfies the target security level (S600).

Then, when the input value of the authentication-purposed user-input type satisfies the target security level (S600), the authentication processing unit 180 may perform user authentication using the authentication-purposed user-input type to which the verified target security level is applied (S900). Thus, the user may receive the target service based on the user authentication result.

Otherwise, when the security level verification unit 140 determines that the input value of the authentication-purposed user-input type does not satisfy the target security level (S600) or when the target security level changes due to the environment change, the environment processing unit 150 of the user authentication device 100 extracts environment information around the user and monitors the environment data and acquires the environment data again (S700).

Then, the environment processing unit 150 of the user authentication device 100 updates current environment data into the acquired environment data and reselects an authentication-purposed user-input type suitable for the current situation (S800).

In this connection, when reselecting the authentication-purposed user-input type, the user authentication device 100 may change the driving environment or control the driving state without changing the authentication-purposed user-input type. To this end, the user authentication device 100 records a previous state before controlling the driving state or changing the driving environment, and restores the previous state after performing authentication.

In one example, when a target service requires a security level 3 for user authentication, a current authentication-purposed user-input type meets a security level 2 at a current driving speed A of the vehicle. In this case, the user authentication device 100 may decrease the vehicle's speed to a speed B to increase an authentication success rate using the current authentication-purposed user-input type. Then, after performing the user authentication using the current authentication-purposed user-input type, the vehicle speed B may be changed to the previous speed A.

In one example, when the authentication device suggests an authentication-purposed user-input type A to the user in a low speed driving state, the user may increase the speed. In this case, the authentication-purposed user-input type A will fail to meet the target security level at a high speed. In this response, the environment processing unit 150 may determine that a combination of authentication-purposed user-input types B and C may satisfy the target security level, and may suggest the combination to the user. The changes in the environment that might disallow the authentication-purposed user-input type A to meet the target level may include not only the change in the speed but also changes in the environment, such as tunnels, window openings, and interiors.

Figure 3:
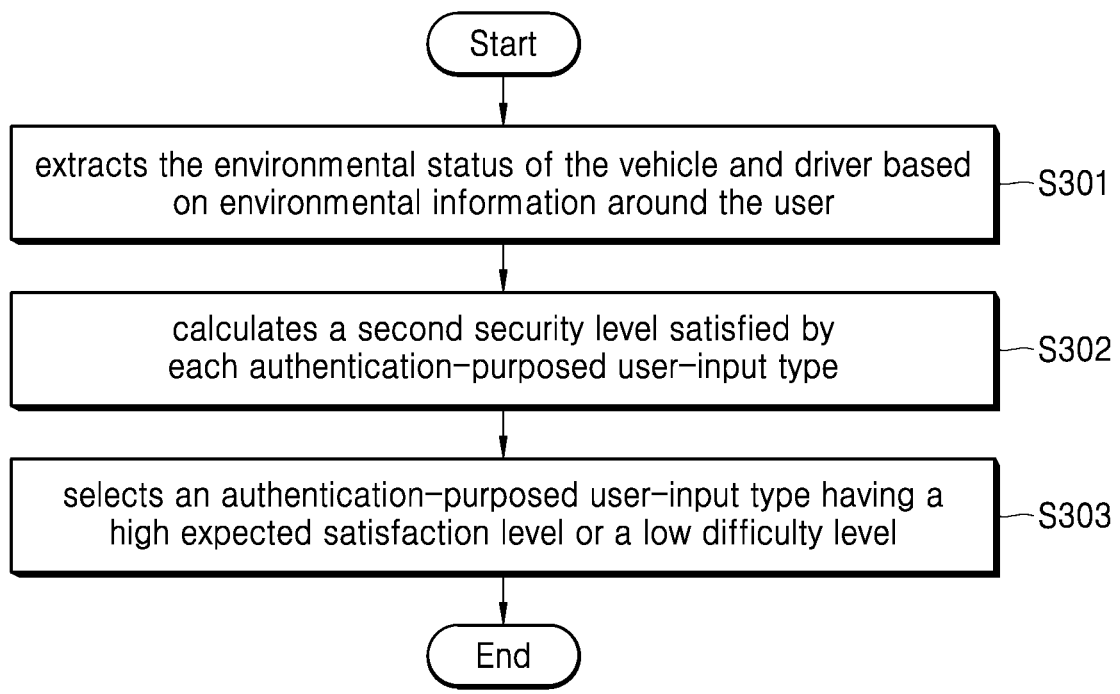
FIG. 3 is a flow chart to describe in detail an example process of detecting an authentication-purposed user-input type in FIG. 2.

FIG. 3 is a flow chart to describe in detail an example process of detecting the authentication-purposed user-input type in FIG. 2.

The state extraction unit 121 extracts the environmental status of the vehicle and driver based on environmental information around the user (S301). In this connection, the extracted environment state around the vehicle and driver is based on the environment information extracted from the environment recognition unit 160. In this connection, the environment information may include information indicating the vehicle and user situation, such as brightness, noise, vehicle position, current time, current weather, vehicle driving state, autonomous driving state.

Then, the security level calculating unit 122 calculates a second security level which may be satisfied by each authentication-purposed user-input type and may be stored in the storage 170 in advance (S302). To this end, the storage 170 stores the vehicle driving environment for each authentication-purposed user-input type, and a security level satisfying-ability (or difficulty level) for each driver state.

Thereafter, the authentication-purposed user-input type selection unit 123 selects an authentication-purposed user-input type having a high expected satisfaction level or a low difficulty level among the calculated second security levels from the security level calculating unit 122 (S303). That is, the authentication-purposed user-input type selection unit 123 selects an authentication-purposed user-input type having a high expected satisfaction level to meet the first security level extracted from the security level extraction unit 110. In one example, the authentication-purposed user-input type with the high expected satisfaction level means an authentication-purposed user-input type with a low authentication error rate when user authentication is performed using an input value of a corresponding authentication-purposed user-input type. Further, the authentication-purposed user input with the low difficulty level means an authentication-purposed user-input type with a high success rate when user authentication is performed based on a default threshold of a corresponding authentication-purposed user input type. In this connection, at least one or more authentication-purposed user-input types may be selected for each target service.

Then, the authentication-purposed user-input type refers to a factor type used as authentication technology for user authentication. The authentication-purposed user-input type may include a user biometric feature or user motion. For example, the authentication-purposed user-input type may include user identifier (ID), password, token, user's biometric information, motion information, and so on. Biometric information may include fingerprints, veins, retinas, irises, voices, and images. Motion information may include gestures, text, position of touch points, shapes, and areas.

FIG. 8 and FIG. 9 show example methods for evaluating an expected satisfaction level or a difficulty level for authenticating an authentication-purposed user-input type in FIG. 3.

Referring to FIG. 8 and FIG. 9, first, a case will be described where a security level 4 based target service requires user authentication in a vehicle stop, manual driving and daytime state.

The authentication-purposed user-input type A may have a difficulty level "middle" in satisfying the security level 4 in the stop state. The authentication-purposed user-input type A may have a difficulty level "very high" in satisfying the security level 4 in the manual driving state. The authentication-purposed user-input type A may have a difficulty level "middle" in satisfying the security level 4 in the daytime state. Thus, in this case, the authentication-purposed user-input type A may be selected only in the vehicle stop and daytime state excluding the manual driving state.

Therefore, the authentication-purposed user-input type selection unit 123 may provide the authentication-purposed user-input type A to the user when the vehicle is in the vehicle stop and daytime state.

Second, a case will be described where a security level 4 based target service requires user authentication in a vehicle speed 80 km/h, manual driving, and daytime state.

The authentication-purposed user-input type A may have a difficulty level "very high" in satisfying the security level 4 in the high speed state. The authentication-purposed user-input type A may have a difficulty level "high" in satisfying the security level 4 in the manual driving state. The authentication-purposed user-input type A may have a difficulty level "middle" in satisfying the security level 4 in the daytime state. Thus, currently, the security level 4 may not be satisfied by the authentication-purposed user-input type A. Rather, a security level 2 may be satisfied by the authentication-purposed user-input type A in a current situation.

In this connection, the authentication-purposed user-input type B is likely to satisfy a security level 2.

Therefore, the authentication-purposed user-input type selection unit 123 may select a combination of the authentication-purposed user-input type A and authentication-purposed user-input type B to satisfy the security level 4 in the current situation. Thus, the present device may present the combination of the authentication-purposed user-input type A and authentication-purposed user-input type B to the user.

Figure 4:
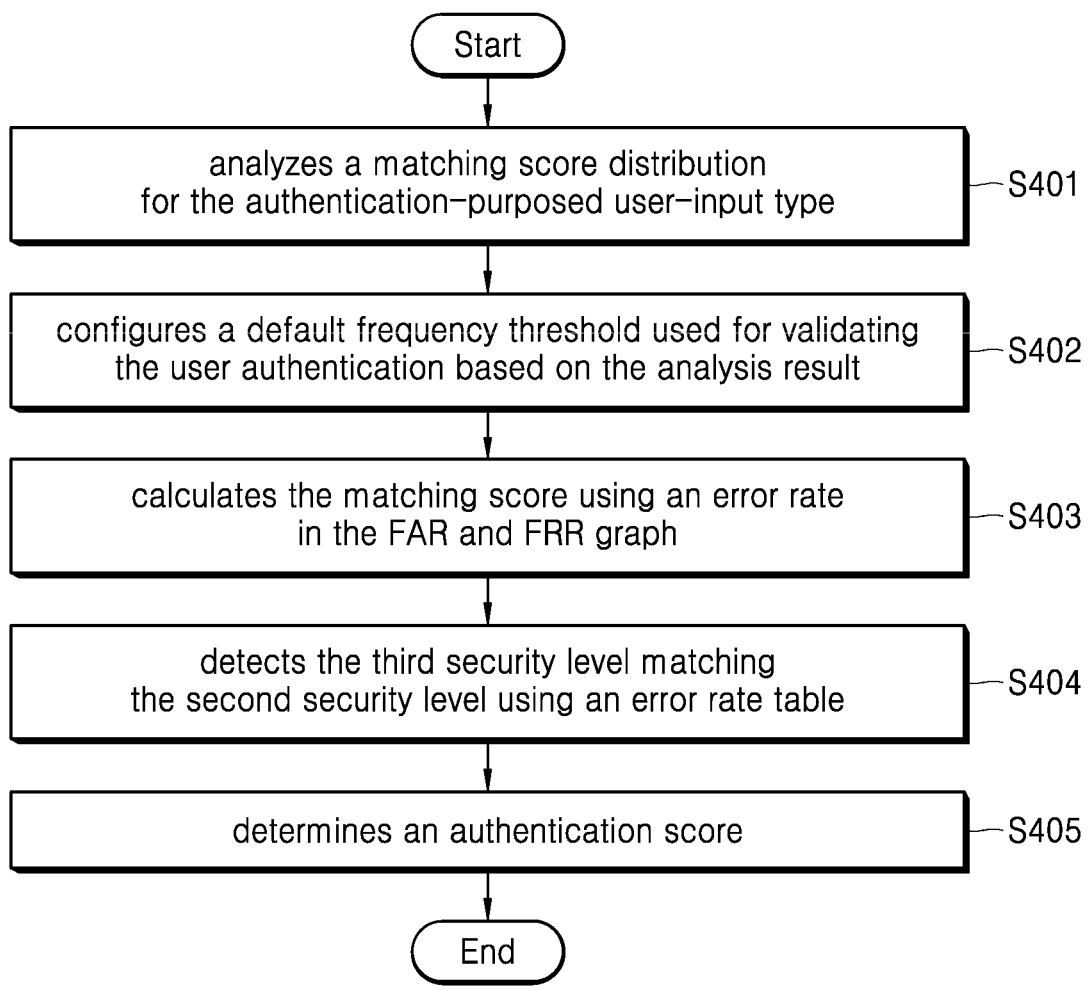
FIG. 4 is a flow chart describing an example process for generating an authentication score in FIG. 2.

FIG. 4 is a flow chart describing the example process for generating an authentication score in FIG. 2.

Referring to FIG. 4, the data distribution analyzing unit 131 analyzes a matching score distribution for the authentication-purposed user-input type detected by the authentication-purposed user-input type detection unit 120 (S401).

Then, the data distribution analyzing unit 131 configures a default frequency threshold used for validating the user authentication based on the analysis result (S402). In this connection, the default threshold may refer to a threshold conventionally selected based on the matching score distribution for each authentication-purposed user-input type to validate the user authentication.

Figure 5A:
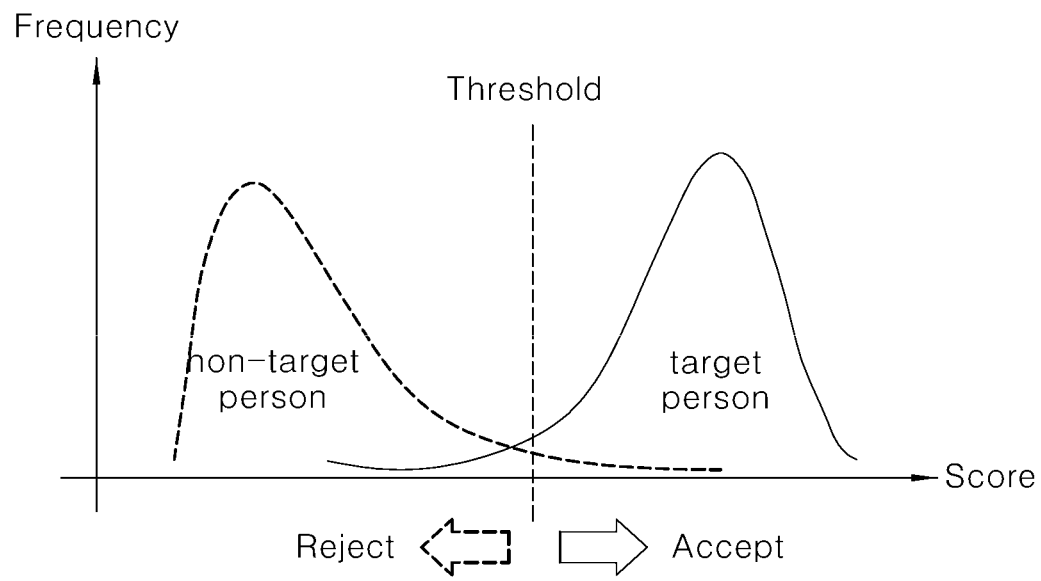
FIG. 5A and FIG. 6A show example matching score distributions related to an input value of an authentication-purposed user-input type in FIG. 4.
Figure 6A:
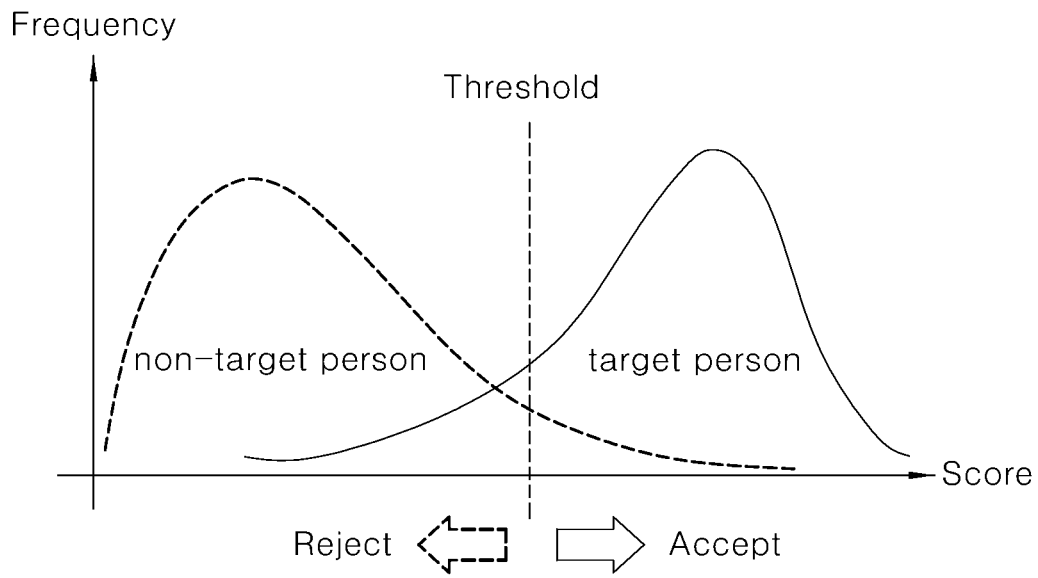

FIG. 5A and FIG. 6A show example matching score distributions for an input value of an authentication-purposed user-input type in FIG. 4.

As shown in FIG. 5A and FIG. 6A, the matching score distributions for a target person and a non-target person may be different from each other for each authentication-purposed user-input type. In this connection, as the authentication-purposed user-input type is more accurate, the matching score distributions for a target person and a non-target person may be distinguished from each other in a clearer manner.

In one approach, once one optimal threshold is selected, a matching score for the input value of the authentication-purposed user-input type is compared with a selected threshold to validate the user authentication.

However, in accordance with the present disclosure, as shown in FIG. 5A and FIG. 6A, the data distribution analyzing unit 131 may select a default threshold varying based on the matching score distribution of each of the target person and the non-target person for each authentication-purposed user-input type.

Subsequently, the matching score calculating unit 132 calculates at least two or more matching scores having different security levels based on the default threshold configured for each authentication-purposed user-input type (S403). In this connection, the matching score calculating unit 132 calculates the matching score using an error rate in the FAR and FRR graphs.

Figure 5B:
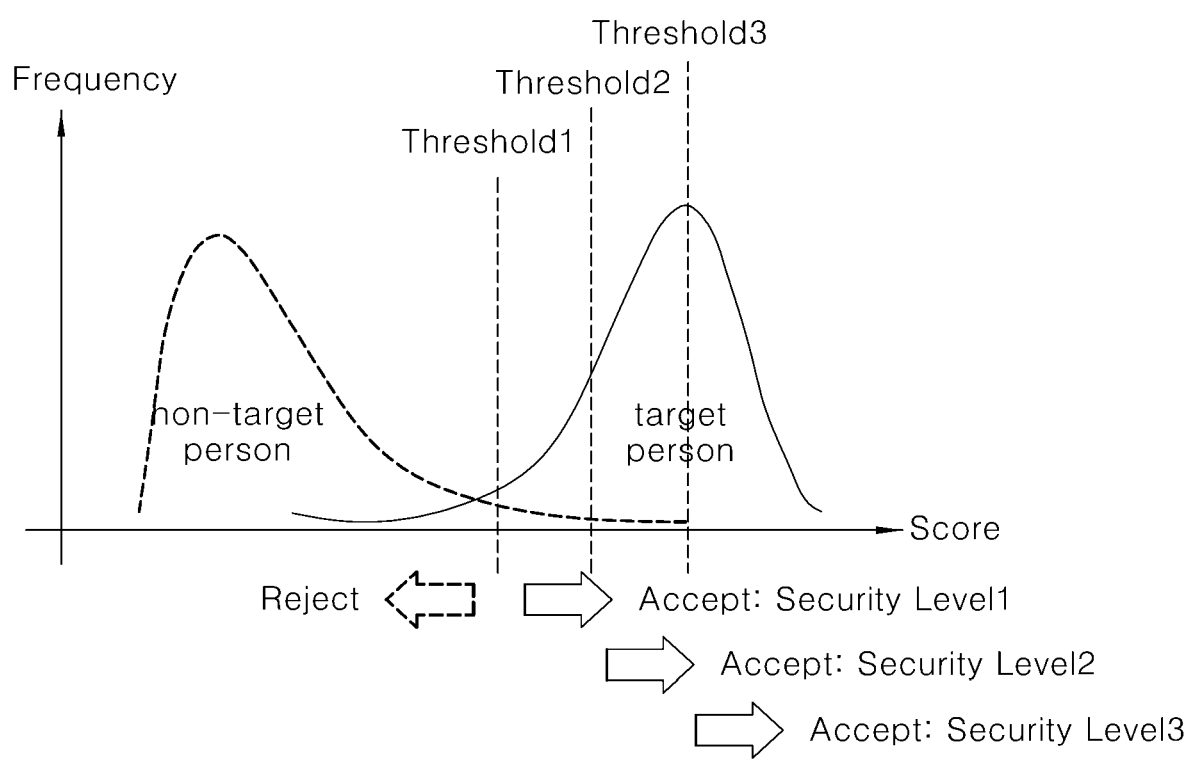
FIG. 5B and FIG. 6B show calculated example matching scores based on the matching score distribution related to an input value of an authentication-purposed user-input type in FIG. 4.
Figure 6B:
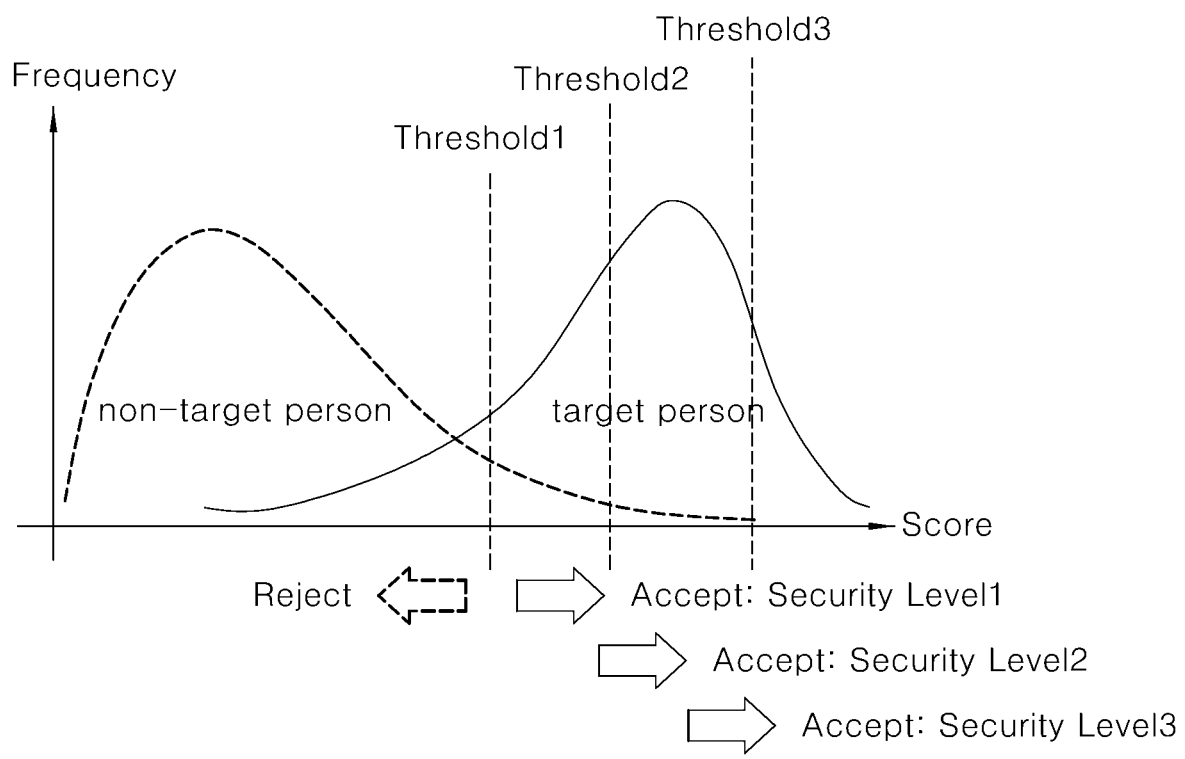
Figure 7:
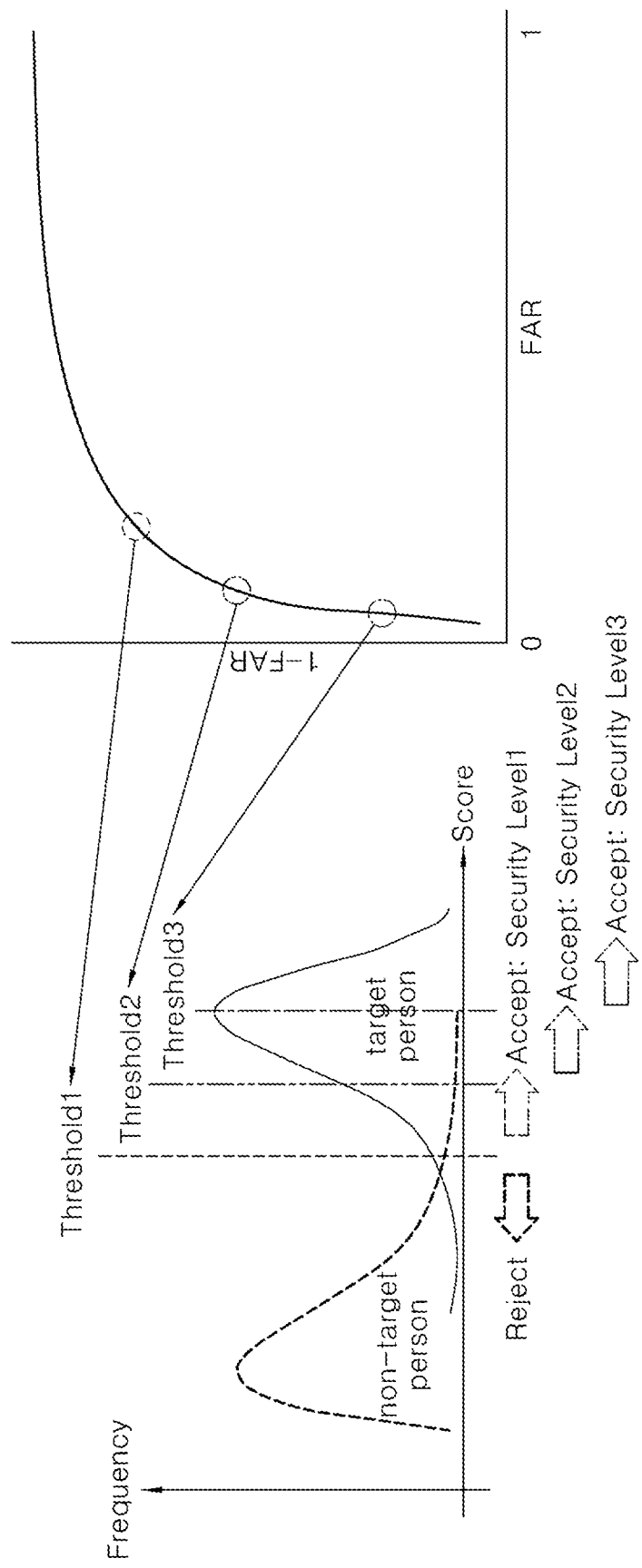
FIG. 7 is a diagram to describe an example criteria for calculating a matching score in FIG. 4.

FIG. 5B and FIG. 6B show calculated example matching scores based on the matching score distribution related to an input value of an authentication-purposed user-input type in FIG. 4. FIG. 7 is a diagram to describe an example criteria for calculating the matching score in FIG. 4.

As shown in FIG. 5B and FIG. 6B, first, second, and third thresholds (Threshold 1, 2, and 3) may have different error rates based on the target services. In other words, as the first, second, and third threshold (Thresholds 1, 2, and 3) increase, the FAR (false accept error rate) decreases, but the FRR (false reject error rate) increases. Thus, the threshold may be determined based on the FAR and FRR values.

In this connection, the first, second, and third threshold (Thresholds 1, 2, and 3) may be determined by the graphs of FAR and FRR shown in FIG. 7. The FAR and FRR graphs shown in FIG. 7 represent an inherent curve corresponding to the biometric authentication input type by way of example. The graph of FAR and FRR may have different curves corresponding to different authentication-purposed user-input types.

Then, the matching unit 133 detects the third security level that matches the second security level using an error rate table having an error rate of at least two matching scores calculated by the matching score calculating unit 132 (S404).

That is, as shown in FIG. 7, the matching score calculating unit 132 detects a third security level that matches the second security level using an error rate table that defines a FAR-based security level shown in Table 1 below. In this way, the matching score calculating unit 132 first defines a security level corresponding to each FAR, and then selects a threshold of the authentication-purposed user-input type to satisfy the FAR. In this connection, the higher the threshold, the lower the FAR, and the higher the security level.

TABLE 1

| FAR | Security level |
| --- | --- |
| 1 to 10% | 1 |
| 0.1 to 1% | 2 |
| 0.01 to 0.1% | 3 |
| 0.001 to 0.01% | 4 |

Then, the authentication score determination unit 134 determines an authentication score corresponding to the authentication-purposed user-input type as the third security level matched by the matching unit 133 (S405).

Although the present disclosure has been described with reference to the drawings and embodiments as exemplified above, the present disclosure is not limited to the embodiments and the drawings disclosed herein. It is obvious that various modifications may be made thereto by a person skilled in the art within the scope of the present disclosure. In addition, it should be appreciated that effects to be achieved from configurations of the present disclosure as not expressly mentioned may be acknowledged.

What is claimed is:

1. A user authentication device comprising:
a security level extraction unit configured to extract a first security level corresponding to an input target service;
an authentication-purposed user-input type detection unit configured to detect an authentication-purposed user-input type based on an environment status of a vehicle and a user, wherein the authentication-purposed user-input type is associated with a second security level;
an authentication score generation unit configured to:
analyze a matching score distribution corresponding to the detected authentication-purposed user-input type;
extract a third security level based on False Acceptance Rate (FAR) and False Reject Rate (FRR) associated with the analysis result;
match the extracted third security level with the second security level; and
generate an authentication score corresponding to the detected authentication-purposed user-input type based on the match result;
a security level verification unit configured to:
define the authentication score of the authentication-purposed user-input type as a target security level; and
verify whether an input value of the authentication-purposed user-input type satisfies the target security level; and
an authentication processing unit configured to, based on the input value of the authentication-purposed user-input type satisfying the target security level, perform user authentication using the authentication-purposed user-input type.

2. The user authentication device of claim 1, wherein the authentication-purposed user-input type detection unit comprises:
a state extraction unit configured to extract an environment state of a vehicle and a user based on environment information around the user;
a security level calculating unit configured to calculate the second security level associated with the authentication-purposed user-input type; and
an authentication-purposed user-input type selection unit configured to select an authentication-purposed user-input type having a high satisfaction level or a low difficulty level to match to the first security level.

3. The user authentication device of claim 1, wherein the authentication score generation unit comprises:

a data distribution analyzing unit configured to analyze the matching score distribution corresponding to the detected authentication-purposed user-input type and define a default threshold to validate the user authentication based on the analysis result;

a matching score calculating unit configured to calculate at least two or more matching scores having different security levels based on the default threshold corresponding to each authentication-purposed user-input type;

a matching unit configured to define the third security level by using an error rate table having error rates of the at least two matching scores, wherein the third security level matches with the second security level; and an authentication score determination unit configured to determine the authentication score of the authentication-purposed user-input.

4. The user authentication device of claim 3, wherein the matching score calculating unit calculates matching scores by using an error rate in FAR and FRR graphs.

5. The user authentication device of claim 1, further comprising:

an environment processing unit configured to:
reselect an authentication-purposed user-input type suitable for a current situation based on a determination that the input value of the authentication-purposed user-input type does not satisfy the target security level or based on the target security level changing due to an environment change; and
present the reselected authentication-purposed user-input type to the user; and an environment recognition unit configured to extract environment information around the user to obtain environment data.

6. The user authentication device of claim 1, wherein the first security level is configured based on risk or safety attributes of the target service.

7. The user authentication device of claim 1, wherein the authentication-purposed user-input type detection unit is further configured to detect an authentication-purposed user-input type having a high satisfaction level or a low difficulty level to match to the first security level.

8. The user authentication device of claim 1, wherein the authentication-purposed user-input type comprises at least one of a user identifier (ID), password, token, user biometric information, or user motion.

9. The user authentication device of claim 5, wherein, based on a determination that the input value of the authentication-purposed user-input type does not satisfy the target security level or based on the target security level changing due to an environment change, the environment processing unit is further configured to:

reextract environment information around the user by an environment processing unit to acquire new environment data;
update current environment data into the new environment data; and
reselect an authentication-purposed user-input type corresponding to a current situation.

10. The user authentication device of claim 9, wherein the environment processing unit is configured to reselect the authentication-purposed user-input type by:

changing a driving environment or controlling a driving state;
recording a previous state before controlling the driving state or changing the driving environment; and
restoring the previous state after performing authentication using the reselected authentication-purposed user-input type.

11. The user authentication device of claim 3, wherein the default threshold for authentication-purposed user-input type is configured based on each of matching score distributions for a target person and a non-target person.

12. A user authentication method comprising:

extracting, by a security level extraction unit, a first security level corresponding to an input target service;
detecting, by an authentication-purposed user-input type detection unit, an authentication-purposed user-input type based on an environment status of a vehicle and a user based on environment information around the user, wherein the authentication-purposed user-input type is associated with a second security level corresponding to the authentication-purposed user-input type;
analyzing, by an authentication score generation unit, a matching score distribution corresponding to the detected authentication-purposed user-input type; extracting, by the authentication score generation unit, a third security level based on False Acceptance Rate (FAR) and False Reject Rate (FRR) associated with the analysis result; matching, by the authentication score generation unit, the extracted third security level with the second security level; generating, by the authentication score generation unit, an authentication score corresponding to the detected authentication-purposed user-input type based on the match result;
defining, by a security level verification unit, the authentication score of the authentication-purposed user-input type as a target security level; verifying, by the security level verification unit, whether an input value of the authentication-purposed user-input type satisfies the target security level; and
performing, based on the input value of the authentication-purposed user-input type satisfying the target security level, by an authentication processing unit, user authentication using the authentication-purposed user-input type.

13. The user authentication method of claim 12, wherein the detecting an authentication-purposed user-input type comprises:

extracting, by a state extraction unit, an environment state of a vehicle and a user based on environment information around the user;
calculating, by a security level calculating unit, the second security level associated with the authentication-purposed user-input type; and
selecting, by an authentication-purposed user-input type selection unit, an authentication-purposed user-input type having a high satisfaction level or a low difficulty level among the calculated second security levels, to match to the first security level.

14. The user authentication method of claim 12, wherein the authentication score generation unit performs operations further comprise:

analyzing, by a data distribution analyzing unit, the matching score distribution corresponding to the detected authentication-purposed user-input type;
defining, by the data distribution analyzing unit, a default threshold for verifying authentication based on the analysis result;
calculating, by a matching score calculating unit, at least two or more matching scores having different security levels based on the default threshold corresponding to authentication-purposed user-input type;

defining, by a matching unit, the third security level using an error rate table having error rates of the at least two matching scores, wherein the third security level matches with the second security level; and determining, by an authentication score determination unit, the authentication score of the authentication-purposed user-input type.

15. The user authentication method of claim 14, wherein the default threshold for each authentication-purposed user-input type is configured based on each of matching score distributions for a target person and a non-target person.

16. The user authentication method of claim 14, wherein calculating, by the matching score calculating unit, at least two or more matching scores comprises calculating matching scores using an error rate in FAR and FRR graphs.

17. The user authentication method of claim 14, wherein detecting the third security level comprises:

defining a FAR-based security level; and selecting a threshold corresponding to the authentication-purposed user-input type to satisfy the FAR-based security level.

18. The user authentication method of claim 12, further comprising:

based on a determination that the input value of the authentication-purposed user-input type does not satisfy the target security level or based on the target security level changing due to an environment change, re-extracting, by an environment processing unit, environment information around the user to acquire new environment data;

updating, by the environment processing unit, current environment data into the new environment data; and reselecting, by the environment processing unit, an authentication-purposed user-input type corresponding to a current situation.

19. The user authentication method of claim 18, wherein reselecting the authentication-purposed user-input type comprises:

changing a driving environment or controlling a driving state;

recording a previous state before controlling the driving state or changing the driving environment; and restoring the previous state after performing authentication using the reselected authentication-purposed user-input type.

20. The user authentication method of claim 12, wherein the authentication-purposed user-input type comprises at least one of a user identifier (ID), password, token, user biometric information, or user motion.

* * * * *